July 2, 1935.  N. T. BROWN  2,006,343
CONVEYER FOR VEGETABLE AND FRUIT FUMIGATING DEVICES
Filed Sept. 23, 1931
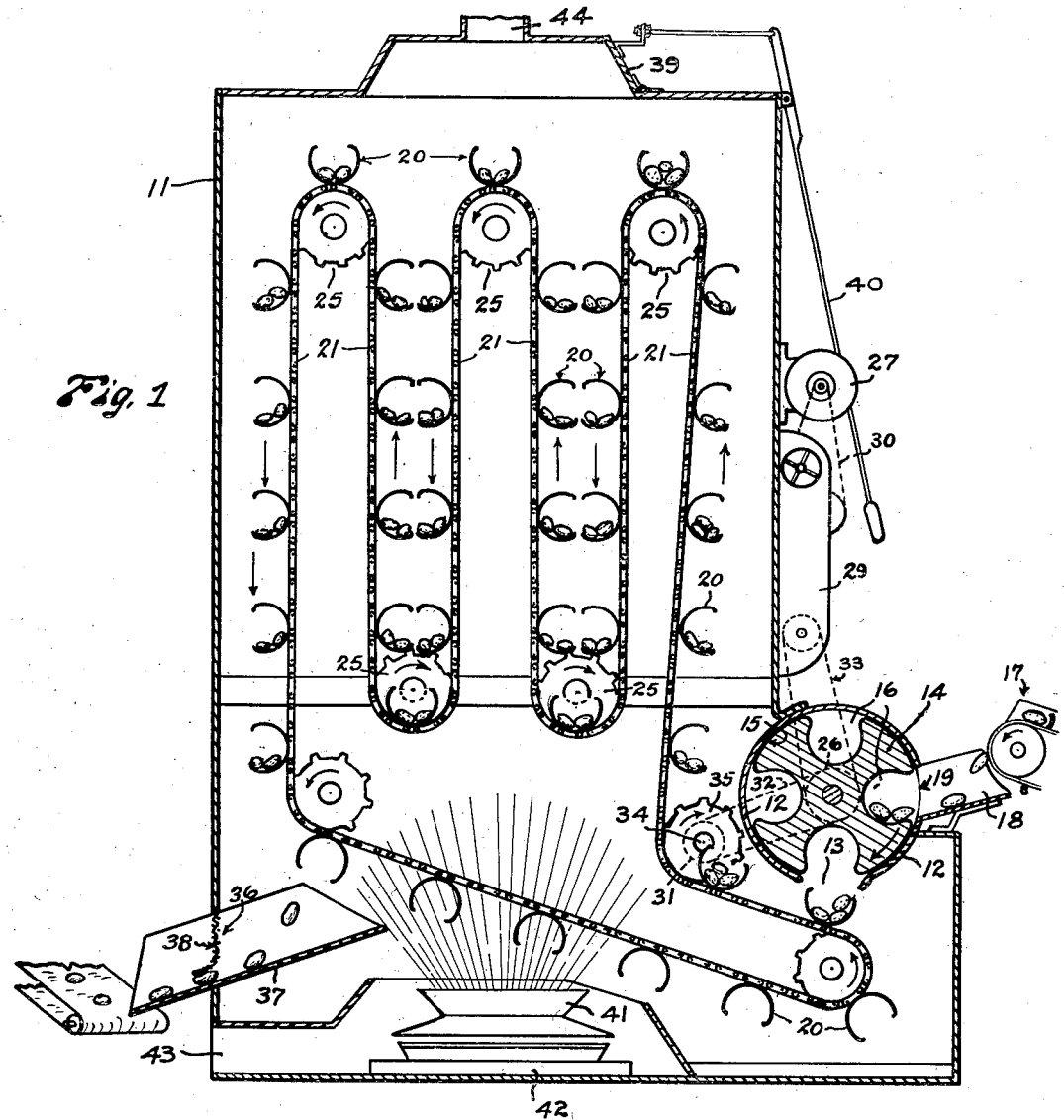
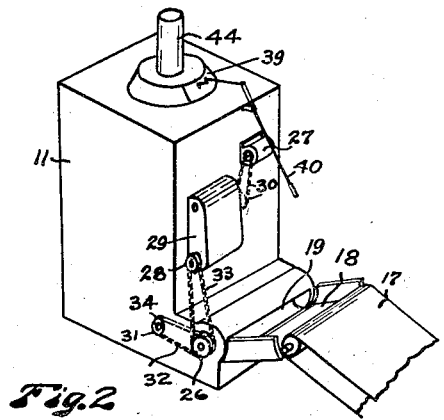
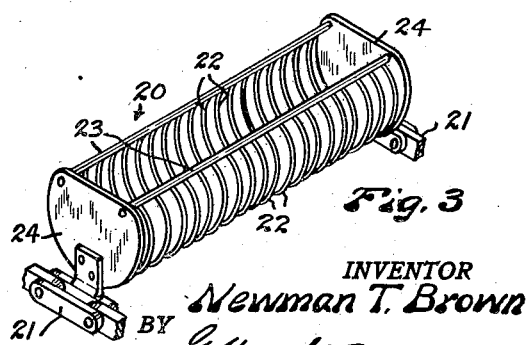
INVENTOR
*Newman T. Brown*
BY
*G. Wright Arnold*
ATTORNEY Patented July 2, 1935

2,006,343

UNITED STATES PATENT OFFICE 2,006,343

CONVEYER FOR VEGETABLE AND FRUIT FUMIGATING DEVICES

Newman T. Brown, Seattle, Wash., assignor to Albert Peter Grommesch, Seattle, Wash., and now by decree of distribution to Katherine H. Grommesch, widow Application September 23, 1931, Serial No. 564,699

1 Claim. (Cl. 198—152)

My invention relates to a vegetable and fruit fumigating device. More particularly, my invention relates to a device whereby vegetables and fruits, from which the skin has been removed, may be subjected to the action of sulphur dioxide or preferably the fumes of burning sulphur. Particularly is my device adapted as a means of carrying out the process of treating potatoes as set forth in a co-pending application of Charles D. Draper, having Serial No. 562,606.

For purposes of definiteness of illustration and clearness of description, I will describe my invention as particularly applied to Irish potatoes (Solanum tuberosum), but it will be understood that said invention is not limited to said vegetable, but is also applicable to other vegetables and fruits and the words Irish potatoes are used hereinafter with such meaning.

The above mentioned general objects of my invention, together with others inherent in the same, are attained by the device illustrated in the following drawing, the same being a preferred exemplary form of embodiment of my invention throughout which drawing like reference numerals indicate like parts:

Figure 1 is a view in vertical section of a device embodying my invention.

Fig. 2 represents a view in perspective of the device embodying my invention.

Fig. 3 is a view in perspective of the buckets forming a part of my invention.

A casing 11 is substantially gas and air tight, and is provided with a curved portion 12 positioned at one side, having an article receiving hole 13 in the base of said portion. A cylindrical timing-feeding drum, indicated generally by 14, is concentrically disposed with respect to said curved portion. Pockets 16 are provided in the drum 14. The outer periphery of the drum 14 is in close proximity to the curved portion 12, so that a substantial gas seal between walls 15 of drum 14 and curved portion 12 is afforded.

Feeding mechanism 17 delivering a supply of skinned potatoes, is provided adjacent a trough 18 entering hole 19. Hole 19, which acts as the intake of my device, is positioned with respect to hole 13 so that a sufficient space of the curved portion 12 exists between hole 13 and hole 19 to permit the walls 15 to consecutively seal passage of gas therebetween as drum 14 rotates.

A plurality of bucket members 20 mounted on continuous conveyer belt 21 pass below receiving hole 13. Said bucket member 20 is preferably made of wood or other material which resists corrosion of the gases used. The sides of said buckets 20 are preferably formed of vertically positioned curved strips or rods 22 connected together by longitudinal members 23 and provided with ends 24. Such a bucket permits the article to slide rather than fall in the bucket as said bucket rotates, and prevents bruising the surface of the article. Said sliding action is particularly desirable when dealing with fruits or vegetables which are easily bruised or crushed.

A plurality of sheaves 25 are placed in staggered relation to engage conveyer belt 21 and to provide maximum utilization of the space within the gas chamber. Driving wheel 31 for operating said conveyer belt 21 is connected to a source of power as electric motor 27, at a reduced speed preferably thru chain means 32, 33 and 30 and sprocket means 26 and 28 and reduction gears, (not shown) disposed within housing 29. Driving wheel 31 is secured to shaft 34 and thereby to sprocket 35, engaging conveyer 21. Thus conveyer 21 and drum 14 are synchronized so the pocket 20 will register with the pockets 16. A discharge opening 36 provided with a chute 37 is placed in casing 11. Said chute 37 may be provided with a flap or outwardly swinging door 38. Such a flap door is used to prevent escape of gases as the potatoes are delivered from my device. Obviously, the timing-feeding means used for entrance of potatoes is likewise applicable for the delivery.

A manhole covered by plate 39, which may be operated by lever means 40, is provided in the casing 11 to enable inspection of the interior of the device. A generator 41 for producing sulphur fumes is provided, said sulphur fumes being formed from burning sulphur instead of sulphur dioxide which may be purchased on the market compressed in cylinders, for the reason that sulphur fumes appear to have a greatly superior result. A heating plate 42, connected to a source of heating as an electric plate, (not shown), is provided beneath the generator for burning sulphur in the generator.

In the operation of my device, I introduce articles such as potatoes, which may be freshly skinned by the process described in my co-pending application Serial No. 562,907, into timing-feeding drum 14. The capacity of the individual pockets 16 in said timing-feeding drum 14 is approximately the same as the capacity of the individual buckets 20. As timing-feeding drum 14 rotates, pockets 16 are successively disposed above discharging hole 13 where potatoes will fall by gravity into buckets 20 on conveyer belt 21. Said conveyer belt passes over sheaves 25 the staggered relation thereof permitting buckets 20 to revolve, thereby causing potatoes, or other articles, to change their position frequently and to expose fresh surfaces of the potatoes to the action of the sulphur fumes. Air intake 43 and exhaust connection 44 are provided to permit a circulation of air for burning sulphur in the generator. It will be understood that the speed at which the buckets travel depends upon the size of the device, the length of time of exposure to the sulphur fumes desired and to the concentration of the sulphur fumes in the air. For potatoes freshly skinned by the process described in my co-pending application, Serial No. 562,907 I have found the length of time desirable for a bucket to make a complete trip is 20 minutes, provided that the sulphur fumes are derived from one fourth ounce to one half ounce of sulphur burned per cubic yard of air.

Obviously, changes may be made in the forms, dimensions, and arrangement of the parts of my invention, without departing from the principle thereof, the above setting forth only preferred forms of embodiment.

I claim:

In a device of the character described, a plurality of sheaves; a bucket mounting conveyer means mounted on said sheaves; and buckets rigidly operatively mounted on said conveyer means, each of said buckets comprising sides of substantially semi-circular shape in transverse section with a restricted opening and said sides formed of a plurality of rods disposed in spaced relation and in parallel planes disposed substantially at right angles to the longitudinal axis of the bucket.

NEWMAN T. BROWN.